United States Patent [19]

Ohmine et al.

[11] Patent Number: 4,940,213

[45] Date of Patent: Jul. 10, 1990

[54] EXHAUST PROCESSING APPARATUS

[75] Inventors: Toshimitsu Ohmine, Tokyo; Takaaki Honda, Numazu; Keiiti Akagawa, Yamato, all of Japan

[73] Assignee: Kabushiki Kaisha Toshiba, Kawasaki, Japan

[21] Appl. No.: 222,905

[22] Filed: Jul. 22, 1988

[30] Foreign Application Priority Data

| Aug. 24, 1987 | [JP] | Japan | 62-209799 |
| Aug. 24, 1987 | [JP] | Japan | 62-209849 |
| Aug. 24, 1987 | [JP] | Japan | 62-209850 |
| Aug. 24, 1987 | [JP] | Japan | 62-209851 |
| Dec. 9, 1987 | [JP] | Japan | 62-309563 |

[51] Int. Cl.$^5$ .............................................. B01D 46/00
[52] U.S. Cl. ....................................... 266/152; 55/314; 55/337; 55/350; 118/715; 118/725; 266/89; 266/148; 266/157; 423/88
[58] Field of Search ............... 266/148, 152, 157, 159, 266/89; 118/715, 725; 423/87, 88; 75/62; 55/312, 314, 316, 337, 342, 350; 420/579

[56] References Cited

U.S. PATENT DOCUMENTS

| 3,885,932 | 5/1975 | Moore, Jr. et al. | 55/350 |
| 4,174,372 | 11/1979 | Myzenkov et al. | 423/88 |
| 4,497,780 | 2/1985 | Barin et al. | 423/88 |
| 4,804,638 | 2/1989 | Hoke et al. | 437/965 |

FOREIGN PATENT DOCUMENTS

| 2813691 | 10/1979 | Fed. Rep. of Germany | 55/350 |
| 3514471 | 10/1986 | Fed. Rep. of Germany | 423/87 |

OTHER PUBLICATIONS

Posa, "A Thorough Fail-Safe System is Necessary in Equipment Using Hazardous Gas", Nikkei Microdevices, Aug., 1986, pp. 91–101.

Primary Examiner—Robert McDowell
Attorney, Agent, or Firm—Foley & Lardner, Schwartz, Jeffery, Schwaab, Mack, Blumenthal & Evans

[57] ABSTRACT

An exhaust processing apparatus comprises a cracking furnace for cracking and solidifying exhaust discharged from a reactor for forming crystals on a semiconductor substrate, a first collecting device for collecting relatively large components solidified in the cracking furnace, a second collecting device for collecting relatively small solidified components passed through the first collecting device, and a chemical or a physical adsorbing member for chemically or physically adsorbing the exhaust passed through the first and second collecting devices.

The apparatus may be provided with bypass piping for bypassing a particular section of the apparatus, a shutoff member for opening and closing the bypass piping and a control device for controlling the shutoff member.

The cracking furnace of the apparatus has a heating portion for heating the exhaust, an enlarged portion disposed downstream the heating portion and having a passage whose cross-sectional area is larger than that of the heating portion, and a cooling mechanism for forcibly cooling the heated exhaust.

36 Claims, 10 Drawing Sheets

EXHAUST PROCESSING APPARATUS

BACKGROUND OF THE INVENTION

1. Field of the Invention

The present invention relates to an exhaust processing apparatus adopted for, for instance, a semiconductor vapor deposition apparatus.

2. Description of the Prior Art

In growing semiconductor crystals, there are a liquid phase crystal growing technique and a vapor deposition technique. Compared to the liquid phase crystal growing technique, the vapor deposition technique has a high controllability to easily grow crystals in multilayer structure and is able to control the composition ratio of crystals according to the partial pressure ratio of source gases.

Due to these advantages, the vapor deposition technique has been developed rapidly in these days. Particularly, a metalorganic chemical vapor deposition (MOCVD) apparatus for growing thin film crystals on a semiconductor substrate is excellent to control the speed of crystal growth, easy to operate and adequate for mass production so that it is catching many attentions.

FIG. 1 is a view showing one example of the vapor deposition apparatus. In the figure, a reactor 105 has a gas inlet 101 and a gas outlet 103. A susceptor 109 is disposed inside the reactor 105 to hold and heat a semiconductor substrate 107. The susceptor 109 is supported with a rotary shaft 111 which is rotatably supported with a bottom wall 105a of the reactor 105 and rotated by a motor (not shown). The reactor 105 has a high-frequency induction heater 113 to heat the susceptor 109.

The semiconductor substrate 107 is held on the susceptor 109 and heated to a predetermined temperature with the susceptor 109 which is heated with the high-frequency induction heater 113. After that, source gases for growing crystals are introduced from the gas inlet 101 into the reactor 105. The source gases react on the semiconductor substrate 107 to grow crystals on the substrate due to the reaction and decomposition of the source gases.

If a GaAs film, for example, is to be formed on the semiconductor substrate 107, $H_2$ is used as a carrier gas and trimethylgallium (TMG) which is organometal and arsine ($AsH_3$) which is hydride are reacted in gas phases.

After the reaction and decomposition, the source gases which remain unreacted flow through a space 115 between a periphery 109a of the susceptor 109 and an inner wall 105b of the reactor 105 and is discharged through the gas outlet 103 to the outside of the reactor 105.

In this vapor deposition apparatus, the unreacted exhaust discharged from the gas outlet 103 includes noxious hydrides such as the arsine and organometal so that various exhaust processing apparatuses shall be installed to treat the noxious exhaust.

FIG. 2 is a view showing an example of the exhaust processing apparatuses. An exhaust processing apparatus 117 comprises a cracking furnace 119, a filter 121 and a chemical trap (a chemical adsorbing member) which are successively disposed in an exhaust flowing direction in the middle of piping 118 connected to the gas outlet 103 of the reactor 105.

The cracking furnace 119 has a heater 125 to heat the exhaust including the unreacted source gases passing through the cracking furnace 119 to crack, for instance, part of arsine contained in the exhaust into solid arsenic and hydrogen.

The solid arsenic is collected with the filter 121 disposed downstream the cracking furnace 119. Arsine which has not solidified and passed through the filter 121 is adsorbed with an adsorbing material 127 in the chemical trap 123. With the combination of the cracking furnace 119 and the filter 121, an amount of the arsine to be treated with the chemical trap 123 may be reduced to improve the service life of the chemical trap 123.

However, according to the apparatus mentioned in the above, the finer the filter 121, the higher the collecting efficiency of solidified arsenic as well as the exhaust pressure. As a result, a discharging performance is decreased and an operation at a predetermined pressure hindered. Therefore, the apparatus 117 shall be designed stronger, and sealing structures for connections of the piping 118 stricter In addition, the arsenic solidified in the cracking furnace 119 may clog the filter 121 and piping 118. This may give adverse effects on growing crystals on the semiconductor substrate 107, or may temporarily stop the crystal growth.

Further, in such a conventional apparatus, arsenic vapor generated due to the decomposition may flow out of the cracking furnace 119 and solidify outside the cracking furnace 119 to form dusts to increase load of the dust collecting filter 121. Compared to a cross-section area of a passage of the cracking furnace 119, a diameter of the piping 118 on the downstream side of the cracking furnace 119 suddenly reduces. As a result, unreacted source gases contained in heated exhaust are cooled and solidified around a connection of the piping 118 to clog the piping 118.

SUMMARY OF THE INVENTION

An object of the present invention is to provide an exhaust processing apparatus which can improve a collecting efficiency of unreacted source gases without increasing exhaust pressure.

Another object of the present invention is to provide an exhaust processing apparatus having an extended durability which can securely collect unreacted source gases contained in exhaust while suppressing pressure loss.

Still another object of the present invention is to provide an exhaust processing apparatus which can secure an exhaust passage even if the pressure of exhaust passing through a cracking furnace and a collecting device exceeds a predetermined value.

Still another object of the present invention is to provide an exhaust processing apparatus which can improve an efficiency in removing unreacted source gases contained in exhaust to prevent an exhaust passage from clogging.

In order to accomplish the objects and advantages mentioned in the above, the present invention provides, in one aspect, an exhaust processing apparatus comprising a cracking furnace disposed on the discharging side of a reactor. In the reactor, source gases are supplied to a semiconductor substrate supported inside the reactor to grow crystals on the substrate. Reacted source gases and unreacted source gases are discharged from the reactor to the cracking furnace in which part of the unreacted source gases is cracked and solidified. The exhaust processing apparatus further comprises a first collecting device for collecting relatively large components among those solidified in the cracking furnace, a second collecting device disposed downstream the first collecting device and collecting relatively small components among the solidified components passed through the first collecting device, and a chemical or a physical adsorbing member for chemically or physically adsorbing the exhaust passed through the first and second collecting devices.

With this arrangement, unreacted source gases among exhaust discharged from the reactor are partly cracked and solidified in the cracking furnace. After that, relatively large components among the solidified components are collected with the first collecting device while relatively small components passed through the first collecting device are collected with the second collecting device. The unreacted source gases passed through the first and second collecting devices are chemically or physically adsorbed with the chemical or the physical adsorbing member According to another aspect of the present invention, there is provided an exhaust processing apparatus which comprises a cracking furnace disposed on the exhausting side of a reactor In this reactor, source gases are supplied to a semiconductor substrate supported inside the reactor to form crystals on the substrate. Reacted source gases and unreacted source gases are discharged from the reactor. The exhaust processing apparatus further comprises a collecting device for collecting components solidified in the cracking furnace, a chemical or a physical adsorbing member for chemically or physically adsorbing the exhaust passed through the collecting device, bypass piping for bypassing a section between the reactor and the chemical or the physical adsorbing member, a shutoff member for opening and closing the bypass piping, and a control device for controlling the shutoff member. The control device opens the shutoff member when the pressure of exhaust passing through the cracking furnace and collecting device exceeds a predetermined value.

With this arrangement, when the pressure of exhaust passing through the cracking furnace and collecting device exceeds the predetermined value, the control device opens the shutoff member to flow the exhaust from the reactor to the chemical or physical adsorbing member.

According to still another aspect of the present invention, there is provided an exhaust processing apparatus comprising a cracking furnace disposed on the exhausting side of a reactor. In the reactor, source gases are supplied to a semiconductor substrate supported inside the reactor to grow crystals on the substrate. Reacted and unreacted source gases are discharged from the reactor. The exhaust processing apparatus further comprises a collecting device for collecting solid components solidified in the cracking furnace. The cracking furnace has a heating portion for heating the exhaust and an enlarged portion disposed downstream said heating portion and having a passage whose cross-sectional area is larger than that of the heating portion.

With this arrangement, exhaust from the reactor is heated and cracked in the heating portion of the cracking furnace. After that, the exhaust is expanded in the enlarged portion to slow a flowing speed of the exhaust, thus increasing the solidification rate of the unreacted source gases and preventing the solidified components from clogging an outlet of the heating portion.

According to still another aspect of the present invention, there is provided an exhaust processing apparatus comprising a cracking furnace for decomposing unreacted gases contained in exhaust discharged from a vapor deposition reactor The cracking furnace comprises a heating portion for heating and decomposing the exhaust, an enlarged portion disposed downstream the heating portion to collect the decomposed components, a cooling mechanism disposed inside the enlarged portion to cool the decomposed components, and an outlet connected to the enlarged portion to discharge a carrier gas in the enlarged portion.

According to this arrangement, the vapor of reactive products is forcibly cooled and solidified with the cooling mechanism and adheres to the cooling mechanism so that the decomposed products can be surely collected in the enlarged portion. The decomposed products will not escape from the outlet, thus preventing the outlet from clogging to reduce replacement frequencies of filters disposed on the downstream stages.

These and other objects, features and advantages of the present invention will become apparent from the following descriptions of preferred embodiments taken in conjunction with the accompanying drawings.

DETAILED DESCRIPTION OF THE PREFERRED EMBODIMENTS

Figure 3:
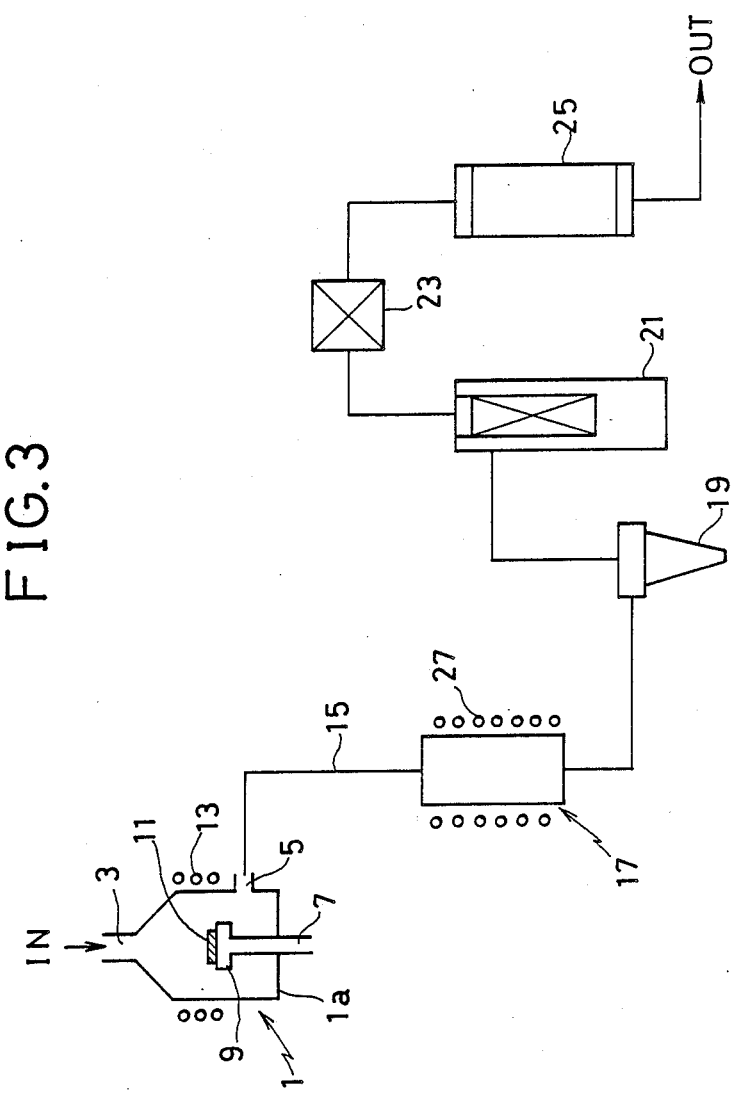
FIG. 3 is a schematic view showing an exhaust processing apparatus according to a first embodiment of the present invention.

FIG. 3 is a view showing an exhaust processing apparatus according to the first embodiment of the present invention.

Firstly, the constitution of a reactor 1 will be described. The reactor 1 has a gas inlet 3 and a gas outlet 5. At a bottom wall 1a of the reactor 1, there is rotatably supported a rotary shaft 7 which in turn supports a susceptor 9. The susceptor 9 holds a semiconductor substrate 11 and is rotated with a motor (not shown). The reactor 1 has a high-frequency induction heater 13 for heating the semiconductor substrate 11 to a predetermined temperature.

Piping 15 of the exhaust processing apparatus is connected to the gas outlet 5 of the reactor 1. In the middle of the piping 15, a cracking furnace 17, a cyclone 19, a membrane filter (a first collecting device) 21, a depth filter (a second collecting device) 23 and a chemical trap (a chemical adsorbing member) 25 are successively disposed in an exhaust flowing direction.

The cracking furnace 17 has a heater for heating exhaust discharged from the reactor 1. Therefore, part of unreacted source gases such as arsine contained in the exhaust is cracked in the cracking furnace 17 into arsenic (solidified components) and hydrogen to flow toward the cyclone 19.

The cyclone 19 has a cylindrical upper portion and a funnel-like lower portion. The exhaust is introduced into the upper portion of the cyclone 19 in a tangential direction and swirls. Due to a centrifugal action of the exhaust, part of the arsenic contained in the exhaust hits an inner wall of the cyclone 19 and drops downward while the exhaust flows upward through a center pipe.

The membrane filter 21 has relatively coarse meshes. When the exhaust passes through the filter 21, relatively large arsenic components are collected with it because the large arsenic components cannot pass through the filter 21. Since the meshes of the filter 21 are relatively coarse, pressure loss of the exhaust is small.

The depth filter 23 has fibrous material such as a nonwoven cloth with relatively fine meshes. The fibrous material has a certain thickness along the direction of the flow of exhaust. When the exhaust passes through the filter 23, relatively small solidified arsenic components passed through the membrane filter 21 hit the fibrous material and are completely collected with the filter 23. Namely, the small solidified arsenic components hit the meshes of the fibrous material to tangle around the fibers and are completely collected with the fibers. Since the collecting principles of the filters 21 and 23 are different from each other, pressure loss of the exhaust passing through the depth filter 23 is relatively small.

The chemical trap 25 contains a chemical adsorbing member. The chemical adsorbing member is, for instance, a material for chemically adsorbing arsine.

An operation of this embodiment will be described.

Unreacted source gases which have not contributed to reaction in the reactor 1 are discharged as exhaust from the gas outlet 5 into the piping 15. The exhaust is introduced into the cracking furnace 17 in which the unreacted source gases such as arsine are cracked into solid arsenic and hydrogen.

The exhaust containing the solidified arsenic flows to the cyclone 19 in which part of the arsenic is removed from the exhaust. Then, the membrane filter 21 collects relatively large arsenic, and the depth filter 23 completely collects the remaining solidified arsenic. The arsine passed through the filters 21 and 23 is chemically adsorbed in the chemical trap 25, and the remaining exhaust is discharged outside.

As described in the above, according to the first embodiment of the present invention, the membrane filter 21 for collecting relatively large arsenic, the depth filter 23 for collecting relatively small arsenic and the chemical trap 25 for adsorbing arsine are sequentially disposed in an exhaust flowing direction. Accordingly, arsenic solidified in the cracking furnace 17 and arsine not solidified can be surely removed from the exhaust.

The membrane filter 21 which is coarse and causes small pressure loss collects roughly the relatively large solidified arsenic, and the depth filter 23 which is disposed downstream the membrane filter 21 and causes small pressure loss surely collects the small solidified arsenic so that the total pressure loss may be small. Namely, since the membrane filter 21 has relatively coarse meshes, the membrance filter 21 causes a large collecting capacity and small pressure loss The depth filter 23 causes a large collecting capacity and a large pressure loss. However, initial pressure loss is sufficiently small, therefore, it is able to collect the small solidified arsenic. With both the filters 21, 23, there is achieved an exhaust processing apparatus which is capable of collecting the small solidified arsenic and causing a large collecting capacity and small pressure loss. Therefore, the exhaust smoothly flows toward the chemical trap 25 to improve the durabilities of the filters 21 and 23 and chemical trap 25.

Since the total pressure loss is small, exhaust pressure is not needed to be set to a high value, an operation pressure maintained at a predetermined value, and the sealing structure of a connection of the piping 15 need not to set strictly.

The present invention is not limited to the above-mentioned embodiment but the cyclone 19 may be omitted to realize the same effect only with the filters 21 and 23 and chemical trap 25.

As the second collecting device, an electric dust collector may be used instead of the depth filter 23. In this case, corona discharge is utilized to give electric charge to the solidified arsenic to separate the charged particles by Coulomb force.

The chemical trap 25 may be replaced with a physical adsorbing member to realize the same effect.

The second embodiment of the present invention will be described with reference to FIGS. 4 to 6.

The second embodiment is provided with a bypass passage which is for bypassing filters and piping when the filters and piping are temporarily clogged with solidified arsenic, etc.

Figure 1:
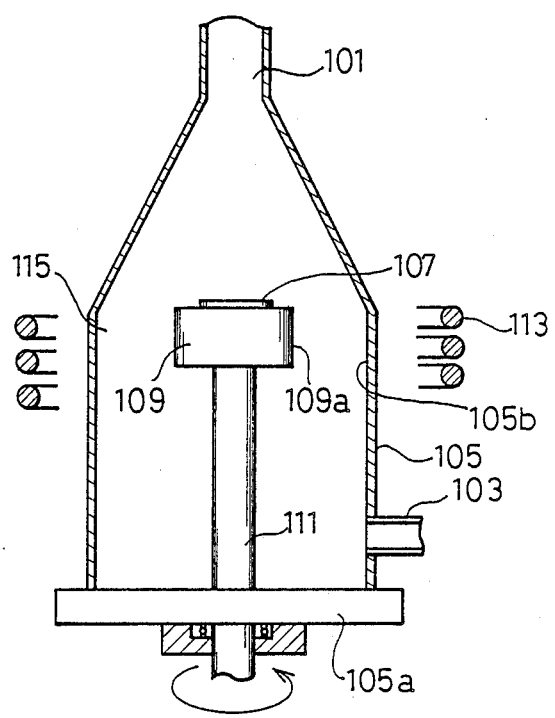
FIG. 1 is a vertical section schematically showing a reactor of a vapor deposition apparatus to which an exhaust processing apparatus is applied.
Figure 2:
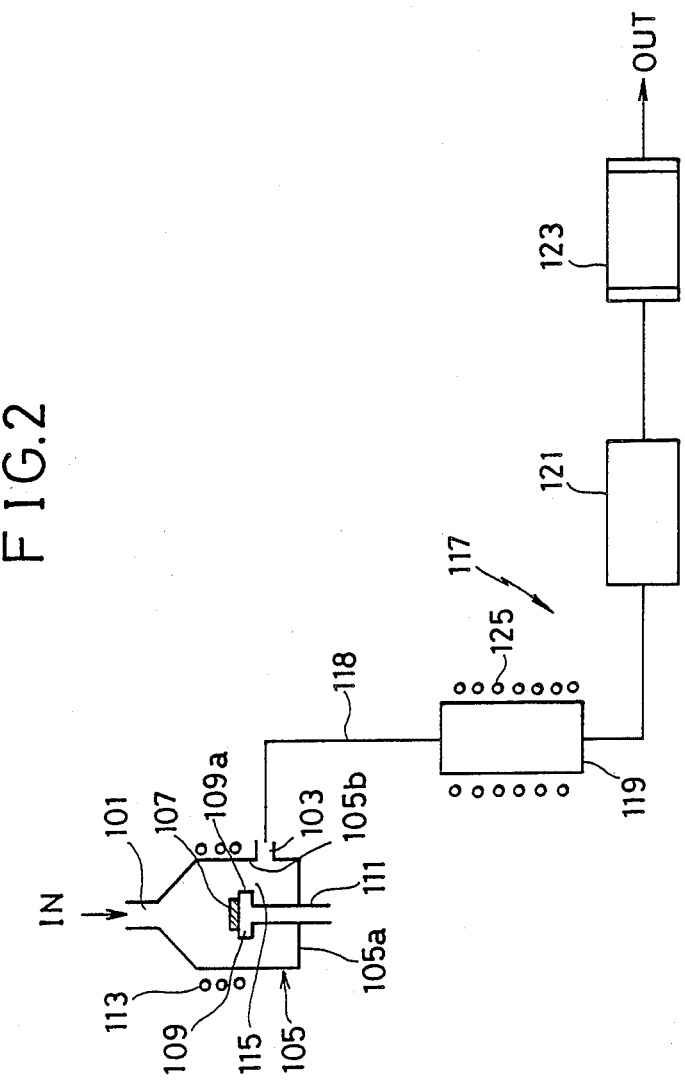
FIG. 2 is a schematic view showing a conventional exhaust processing apparatus fitted to the reactor shown in FIG. 1.

In the figures, the same elements as those of the first embodiment shown in FIG. 1 are represented with the same reference numerals to omit their explanations.

Figure 4:
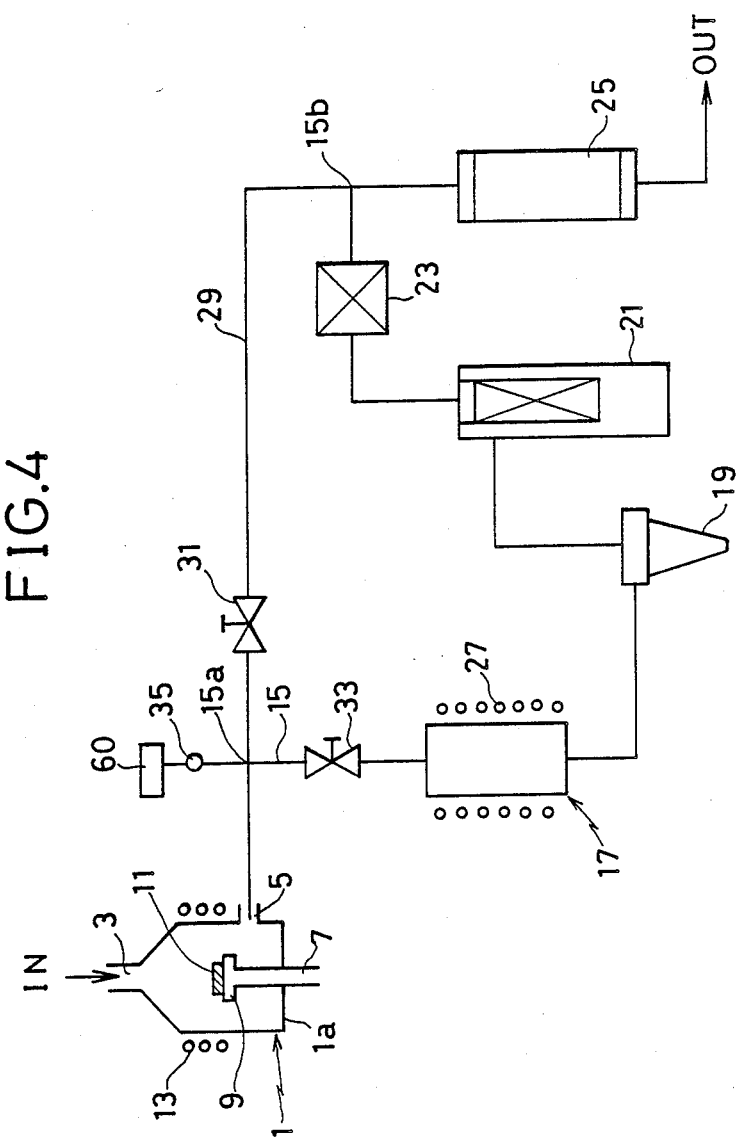
FIG. 4 is a schematic view showing an exhaust processing apparatus according to a second embodiment of the present invention.

As shown in FIG. 4, bypass piping 29 is arranged between a gas outlet 5 of a reactor 1 and a chemical trap 25. The upstream side of the bypass piping 29 is connected to a branching portion 15a of piping 15 and the downstream side to a branching portion 15b.

In the middle of the bypass piping 29, a first shutoff valve (a shutoff member) 31 is disposed to open and close the bypass piping 29. In the middle of the piping 15 between the branching portion 15a and a cracking furnace 17, a second shutoff valve 33 is disposed. A pressure gauge 35 is disposed at the branching portion 15a to detect a pressure of exhaust in the piping 15.

The first and second shutoff valves 31 and 33 and pressure gauge 35 are connected to a control device 60 comprising a solenoid. The solenoid 60 opens the first shutoff valve 31 and closes the second shutoff valve 33 when the pressure of exhaust detected with the pressure gauge 35 exceeds a predetermined value.

An operation of the second embodiment will be described.

Unreacted source gases in the reactor 1 are discharged as exhaust from the gas outlet 5 into the piping 15. The unreacted source gases such as arsine contained in the exhaust are cracked in the cracking furnace 17 into solid arsenic and hydrogen.

The exhaust containing the solidified arsenic flows to a cyclone 19 which removes part of the arsenic from the exhaust. Then, relatively large arsenic particles are collected with a membrane filter 21, and remaining solidified arsenic particles are completely collected with a depth filter 23. The arsine passed through the filters 21 and 23 is chemically adsorbed with the chemical trap 25, and the remaining exhaust is discharged outside.

When the membrane filter 21 or the depth filter 23 is clogged, a pressure of exhaust in the piping 15 increases. When the pressure is detected with the pressure gauge 35, the solenoid 60 opens the first shutoff valve 31 and closes the second shutoff valve 33.

As a result, exhaust from the reactor 1 passes through the gas outlet 5 and bypass piping 29 to secure an exhaust flowing passage toward the chemical trap 25 where arsine contained in the exhaust is adsorbed. If the reactor 1 is directly connected to the chemical trap 25, the load on the chemical trap 25 may be increased, but if the direct connection is down for a short time, almost all the arsine may be absorbed only with the chemical trap 25.

Then, filter cartridges in the filters 21 and 23 are replaced with new ones while the exhaust is passing through the bypass piping 29.

As described above, according to this embodiment, an exhaust passage is secured even if the membrane filter 21 or the depth filter 23 is clogged so that crystals can be continuously grown on a semiconductor substrate 11 in the reactor 1.

A clogging state of the membrane filter 21 or of the depth filter 23 can be confirmed by detecting a value on the pressure gauge 35.

The present invention is not limited to the above-mentioned embodiment but the cyclone 19 may be omitted to realize the same effect only with the filters 21 and 23 and chemical trap 25.

Namely, without the cyclone 19, almost all the arsenic and arsine may be absorbed, however, with the cyclone 19, the life-times of the filters 21, 23 and chemical trap 25 are improved.

The second shutoff valve 33 may be omitted to realize the same effect because the exhaust passes through the bypass piping 29 only by opening the first shutoff valve 31. The first shutoff valve 31 may be manually opened and closed.

The chemical trap 25 may be replaced with a physical adsorbing member to achieve the same effect.

Two modifications of the second embodiment of the present invention will be described with reference to FIGS. 5 and 6, respectively.

Figure 5:
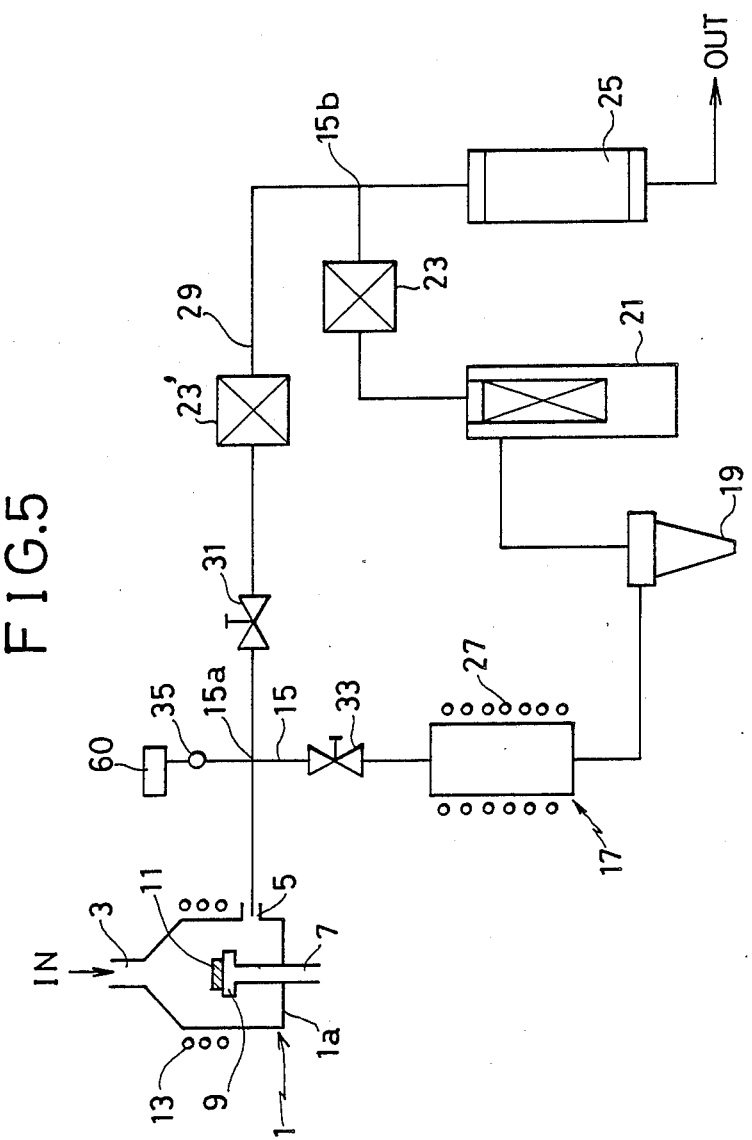
FIGS. 5 and 6 are schematic views showing modifications of the second embodiment shown in FIG. 4 respectively.

In the modification shown in FIG. 5, a depth filter 23' having relatively fine meshes is disposed in the middle of bypass piping 29. With this arrangement, even if a first shutoff valve 31 is opened to pass exhaust through the bypass piping 29, solid components decomposed and produced in the reactor can be removed with the filter 23'.

Figure 6:
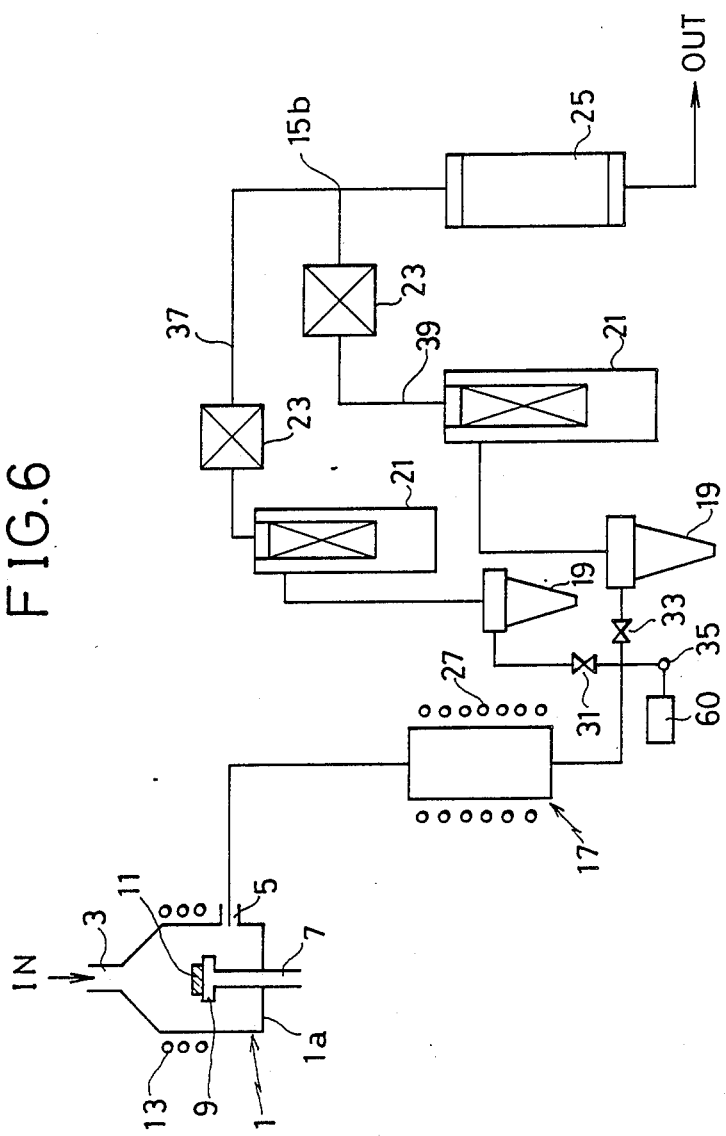

In the modification shown in FIG. 6, bypass piping 37 is disposed between a cracking furnace 17 and a chemical trap 25. In the middle of the bypass piping 37, as in the middle of piping 39, a cyclone 19, a membrane filter 21 and a depth filter 23 are arranged. A first shutoff valve (a first shutoff member) 31 is disposed on the bypass piping 37 to open and close the bypass piping 37, while a second shutoff valve 33 is disposed on the piping 39 between a branching portion 15a and a cyclone 19. At the branching portion 15a, a pressure gauge 35 is disposed to detect a pressure of exhaust in the piping 39.

The first and second shutoff valves 31 and 33 and pressure gauge 35 are connected to a solenoid 60. The solenoid 60 opens the first shutoff valve 31 and closes the second shutoff valve 33 when, for instance, the pressure of exhaust detected with the pressure gauge 35 exceeds a predetermined value.

According to the modification shown in FIG. 6, when the pressure of exhaust in the piping 39 exceeds the predetermined value, the exhaust is passed through the bypass piping 37 to completely remove arsenic, etc., with the cyclone 19, membrane filter 21 and depth filter 23 on the bypass piping 37, as in the case of the piping 39. While the exhaust are being discharged through the bypass piping 37, filtering portions such as the cyclone 19, membrane filter 21 and depth filter 23 of the piping 39 may be replaced with new ones.

Cracking furnaces to be used for the first and second embodiments will be described with reference to FIGS. 7 to 13, respectively.

Figure 7:
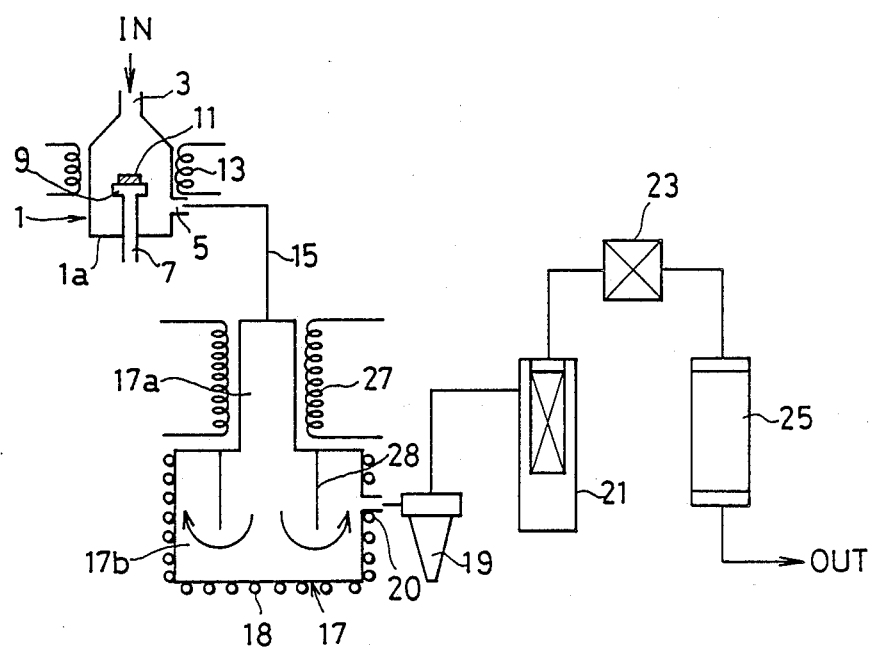
FIG. 7 is a schematic view showing a cracking furnace used for the first and second embodiments of the present invention.

Firstly, the cracking furnace 17 of the first embodiment shown in FIG. 3 will be described with reference to FIG. 7.

A cross-sectional area of a passage of the cracking furnace 17 is larger than that of the piping 15. The cracking furnace 17 comprises a heating portion 17a having a passage whose cross-sectional area is substantially uniform through the upstream side and the downstream side thereof, and an enlarged portion 17b disposed downstream the heating portion 17a and has a passage whose cross-sectional area is larger than that of the heating portion 17a.

Outside the heating portion 17a, a heater 27 for heating exhaust is disposed to reach the enlarged portion 17b. On the periphery of the enlarged portion 17b, a cooling pipe 18 is disposed as a cooling device for forcibly cooling the exhaust heated in the heating portion 17a.

In the enlarged portion 17b, a baffle plate 28 of, for instance, cylindrical shape is arranged downwardly from the top of the enlarged portion 17b. The exhaust is guided along the baffle plate 28 toward the bottom of the enlarged portion 17b and then upward along an inner wall of the enlarged portion 17b which is cooled with the cooling pipe 18.

An outlet 20 of the cracking furnace 17 to the cyclone 19 is located upper than a vertical center of the enlarged portion 17b. The outlet 20 is laterally arranged with respect to an exhaust flowing direction (vertical in FIG. 7).

An operation of the cracking furnace 17 will be described.

Unreacted source gases in the reactor 1 are discharged from the gas outlet 5 to the piping 15. After that, the exhaust is introduced into the heating portion 17a of the cracking furnace 17 and heated with the heater 27. The heated exhaust is introduced into the enlarged portion 17b from the heating portion 17a and forcibly cooled with the cooling pipe 18. Arsenic is substantially in a gas phase at a high temperature and solidified when cooled.

Since the cross-sectional area of the passage in the enlarged portion 17b is larger than that of the heating portion 17a, a speed of the exhaust introduced into the enlarged portion 17b is reduced to increase a residence time of the exhaust in the enlarged portion 17b. As a result, the exhaust is sufficiently cooled to increase a rate of solidification of gaseous arsenic. Therefore, a rate of solidified arsenic at the outlet 20 is reduced to prevent the passage from clogging.

The heater 27 is extended to reach just before the enlarged portion 17b so that the solidification of arsenic is not carried out at the lower portion of the heating portion 17a but is correctly carried out in the enlarged portion 17b. Therefore, the arsenic does not adhere to an inner wall of the heating portion 17a to prevent the passage from clogging.

Due to centrifugal force caused when a flowing direction of the exhaust is changed in the enlarged portion 17b, the solidified arsenic moves toward the bottom of the enlarged portion 17b and collected at there.

The exhaust is guided with the baffle plate 28 toward the bottom of the enlarged portion 17b and then upward along the inner wall of the enlarged portion 17b cooled with the cooling pipe 18, and discharged through the outlet 20. Therefore, a cooling area of the exhaust is increased to surely solidify arsenic contained in the exhaust.

The exhaust containing the solidified arsenic flows toward the cyclone 19 which removes part of the arsenic from the exhaust. After that, relatively large arsenic particles are collected with the membrane filter 21, and the remaining solidified arsenic is completely collected with the depth filter 23. The arsine passed through both the filters 21 and 23 is chemically adsorbed with the chemical trap 25, and the remaining exhaust is discharged outside.

As described in the above, according to this embodiment, the solidification of arsenic existing in arsine in the exhaust is promoted to collect the solidified arsenic so that an amount of arsine to be processed with the chemical trap is reduced to extend the service life of the chemical trap. Further, the passages of exhaust are prevented from clogging.

Figure 8:
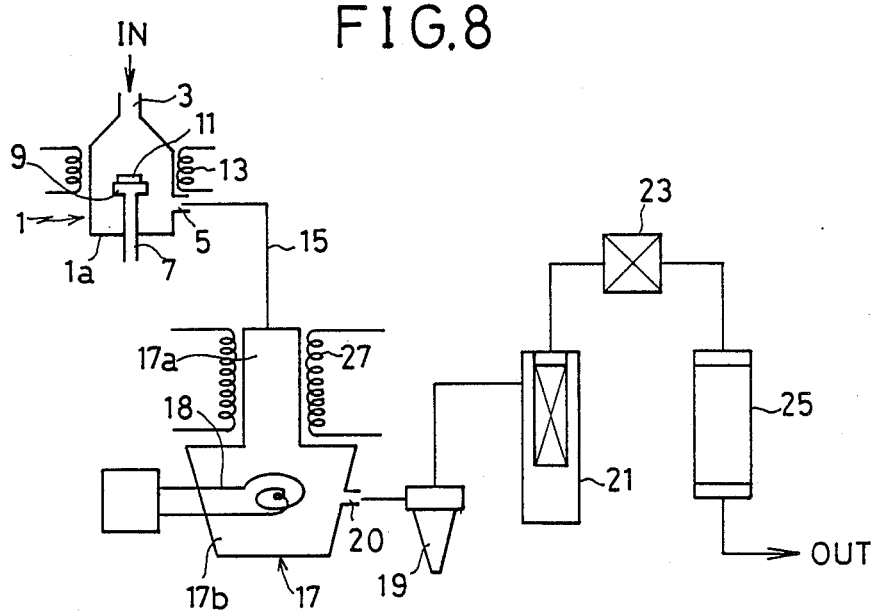
FIGS. 8 to 13 are schematic views showing cracking furnaces according to other embodiments of the present invention respectively.

FIG. 8 is a view showing a cracking furnace according to another embodiment. In the figure, the same elements as those of the previous embodiment are represented with the same reference numerals to omit their explanations.

According to this embodiment, a cooling pipe 18 is disposed inside an enlarged portion 17b. The enlarged portion 17b has no baffle plate 28 of the previous embodiment, and the cross-sectional area of a passage in the enlarged portion 17b is gradually reduced from the upstream side to the downstream side. In this embodiment the total length of the cooling pipe 18 may be reduced to achieve the same effect as that of the previous embodiment.

Figure 9:
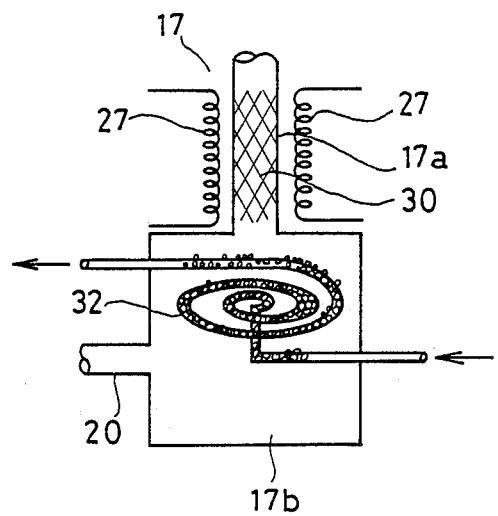

FIG. 9 is a view showing a cracking furnace according to still another embodiment. In the figure, a cracking furnace 17 comprises a heating portion 17a, a metal mesh 30 disposed inside the heating portion 17a, and a heater 27 disposed around the heating portion 17a. The upper part (upstream side) of the heating portion 17a is connected to the discharging side of a reactor (not shown). The lower part of the heating portion 17a is connected to an enlarged portion 17b which is to collect decomposed products. The enlarged portion 17b can be disassembled into upper and lower segments to remove the collected decomposed products. A cooling mechanism 32 comprises a helical pipe disposed just under the heating portion 17a. Inside the cooling mechanism 32, coolant such as water is flown from the outside of the enlarged portion 17b. An outlet 20 is connected to a side wall of the enlarged portion 17b to discharge gases.

With this arrangement, exhaust (unreacted source gases and the carrier gas) from the reactor are introduced from an inlet of the cracking furnace 17 to the heating portion 17a. The unreacted gases introduced together with the carrier gas through the inlet are heated to a predetermined temperature and contact with or pass through the metal mesh 30 to become vapor of reacted products. The vapor of reacted products exits from the heating portion 17a and reaches the cooling mechanism 32 where the vapor is forcibly cooled. When the vapor of reacted products is cooled, solidified decomposed products adhere to the cooling mechanism 32. The decomposed products not adhered to the cooling mechanism 32 accumulate on the bottom of the enlarged portion 17b. Namely, the decomposed products are collected on the cooling mechanism 32 having a wide area and on the bottom of the enlarged portion 17b so that exhaust discharged from the outlet 20 contains almost no decomposed products and the vapor of reacted products.

As described in the above, according to the cracking furnace of this embodiment, the cooling mechanism 32 is disposed inside the enlarged portion 17b to forcibly cool the vapor of reacted products so that the decomposed products are surely collected in the enlarged portion 17b. As a result, the decomposed products and the vapor of reacted products are rarely discharged from the outlet 20 to remarkably reduce clogs in the outlet 20 and frequency of filter replacement.

Figure 10:
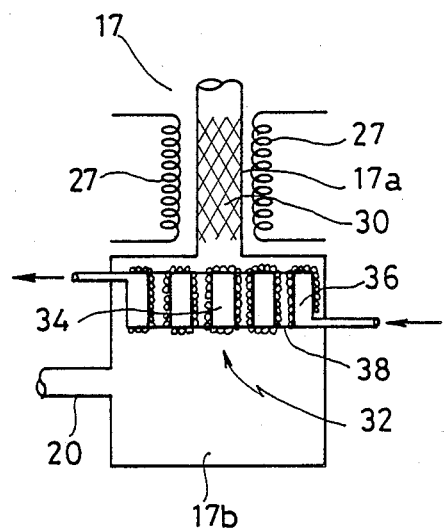
Figure 11:
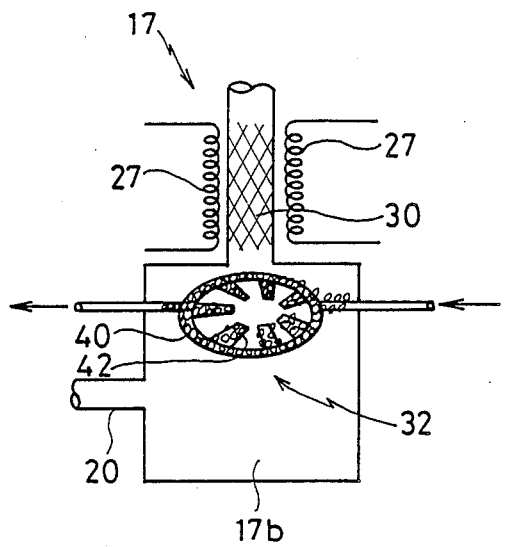
Figure 12:
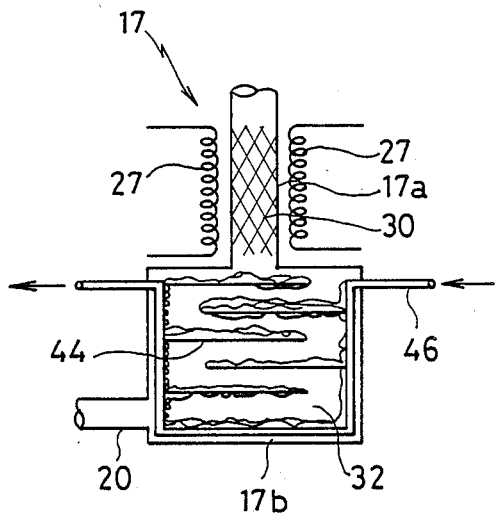

FIGS. 10 to 12 are sectional views showing cracking furnaces according to other embodiments respectively. In the figures, the same parts as those shown in FIG. 9 are represented with the same reference numerals to omit their explanations. These embodiments have cooling mechanisms which are different from the cooling mechanism 32 of the embodiment of FIG. 9.

A cooling mechanism 32 of the cracking furnace shown in FIG. 10 has a disk member 34 having a passage 36 formed inside the disk member 34 to flow coolant. A plurality of through openings 38 for passing exhaust are formed on the disk member 34 perpendicular to the disk member 34.

A cooling mechanism 32 of the cracking furnace shown in FIG. 11 has an annular cooling pipe 40 provided with fins 42 which are obliquely fitted to the inside of the cooling pipe 40. The fins 42 may be disposed in parallel with the cooling pipe 40, and the cooling pipe 40 may be disposed in the plural number.

A cooling mechanism 32 of the cracking furnace shown in FIG. 12 has an enlarged portion 17b in which a plurality of fins (plate members) 44 are disposed to extend a gas passage in the enlarged portion 17b. The fins 44 are alternately fitted to an inner wall surface of the enlarged portion 17b and cooled with a cooling pipe 46. Intervals between the fins 44 may be narrowed gradually from the top toward the bottom of the enlarged portion 17b to increase a collecting efficiency. The cooling pipe 46 may be bent such that contact areas with respect to the fins 44 are increased.

With this arrangement, the cooling mechanism 32 forcibly cools vapor of reacted products to solidify decomposed products, which adhere to the cooling mechanism 32 to realize the same effects as those of the previous embodiments.

Figure 13:
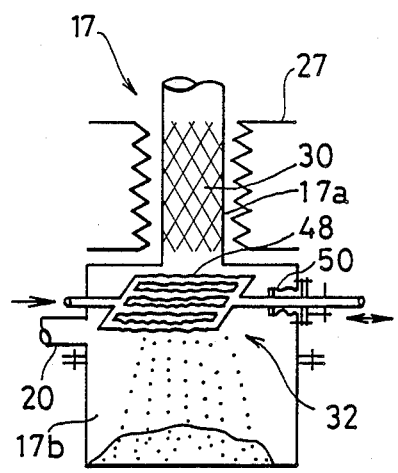

FIG. 13 is a sectional view showing a cracking furnace according to still another embodiment. In the figure, the same parts as those shown in FIG. 9 are represented with the same reference numerals to omit their detailed explanations.

A difference of this embodiment from the previous embodiments is that a cooling mechanism 32 is vibrated. The cooling mechanism 32 has a plurality of bellows pipes 48 connected in parallel with each other and is disposed just under a heating portion 17a of a cracking furnace 17. The cooling mechanism 32 is supported by a side wall of an enlarged portion 17b of the cracking furnace 17 through a bellows flange 50. The cooling mechanism 32 is horizontally vibrated from the outside of the enlarged portion 17b.

With this arrangement, when a certain amount of decomposed products adhere to the cooling mechanism 32, the cooling mechanism 32 is vibrated horizontally to drop the decomposed products from the cooling mechanism 32. Since the decomposed products are not strongly adhering to the cooling mechanism 32, large part of the decomposed products drop from the cooling mechanism 32 due to the vibration. If a large amount of the decomposed products adhere to the cooling mechanism 32, it may clog the lower part of the heating portion 17a of the cracking furnace 17 to deteriorate a cooling efficiency of the cooling mechanism 32. Therefore, by periodically vibrating the cooling mechanism 32, the heating portion 17a is prevented from clogging, and the cooling mechanism 32 can efficiently collect the decomposed products.

In summary, according to the exhaust processing apparatus of the present invention, relatively large components among solidified components solidified in a cracking furnace are collected in a first collecting device, and relatively small components are collected in a second collecting device which is disposed downstream the first collecting device. Accordingly, a durability of the apparatus as a whole is improved while unreacted source gases contained in exhaust are surely collected with pressure loss being suppressed.

Further, according to the present invention, an exhaust passage is secured even if a pressure of the exhaust passing through the cracking furnace and collecting devices exceeds a predetermined value. Therefore, crystals can be continuously grown on a semiconductor substrate in a reactor with no interruption.

Further, according to the present invention, the sectional area of a passage in an enlarged portion of the cracking furnace which is located downstream a heating portion of the cracking furnace is larger than that of the heating portion so that the solidification of components is accelerated in the cracking furnace to improve, with the cooperation of the collecting devices disposed on the downstream side, a service life of the apparatus as a whole.

Further, according to the present invention, the exhaust is forcibly cooled and solidified with a cooling mechanism provided for the cracking furnace so that the solidified products can be collected in the cracking furnace.

Various modifications will become possible for those skilled in the art after receiving the teachings of the present disclosure without departing from the scope thereof.

What is claimed is:

1. An exhaust processing apparatus comprising:
   a cracking furnace disposed on a discharging side of a reactor for cracking and solidifying part of unreacted source gases contained in exhaust emitted from the reactor which supplies source gases to a semiconductor substrate supported inside the reactor to grow crystals on the substrate and discharges the exhaust containing reacted source gases and the unreacted source gases;
   first collecting means having a first member with a plurality of holes for collecting relatively large components solidified in said cracking furnace, said first collecting means being constructed to pass relatively small components and gases and to collect the relatively large components by colliding said relatively large components with a surface of said first member; and
   second collecting means having a second member with a predetermined thickness in an exhaust gas outflowing direction and disposed downstream said first collecting means to arrest relatively small solidified components passed through said first collecting means, said second collecting means being constructed to pass gases and to arrest said relatively small components in said second member.

2. The exhaust processing apparatus as claimed in claim 1, further comprising:
   adsorbing means for chemically and/or physically adsorbing an exhaust passed through said first and second collecting means.

3. The exhaust processing apparatus as claimed in claim 2, wherein said first collecting means comprises a cake-filtration medium having relatively coarse meshes for collecting the relatively large solidified components discharged from said cracking furnace.

4. The exhaust processing apparatus as claimed in claim 3, wherein said second collecting means comprises a depth filtration medium having means for completely arresting in it the relatively small solidified components passed through the cake-filtration medium.

5. The exhaust processing apparatus as claimed in claim 4, wherein the solidified components arresting means comprises a nonwoven cloth.

6. The exhaust processing apparatus as claimed in claim 2, further comprising:
   bypass piping for connecting between the reactor and said adsorbing means.

7. The exhaust processing apparatus as claimed in claim 6, further comprising:
   shutoff means for opening and closing said bypass piping; and
   control means for controlling said shutoff means such that said shutoff means is opened when the pressure of the exhaust passing through said cracking furnace and first and second collecting means exceeds a predetermined value.

8. The exhaust processing apparatus as claimed in claim 5, wherein said bypass piping includes a second depth filter which collects solid particles finer than those collected with said membrane filter.

9. The exhaust processing apparatus as claimed in claim 2, further comprising:
   bypass piping for connecting between said cracking furnace and said adsorbing means.

10. The exhaust processing apparatus as claimed in claim 9, wherein said bypass piping includes:
    a second membrane filter having relatively coarse meshes for collecting relatively large components solidified in said cracking furnace; and
    a second depth filter for substantially completely collecting relatively small solidified components passed through the second membrane filter.

11. The exhaust processing apparatus as claimed in claim 8, further comprising:
    shutoff means for opening and closing said bypass piping; and
    control means for controlling said shutoff means such that said shutoff means is opened when the pressure of the exhaust passing through said first and second collecting means exceeds a predetermined value.

12. The exhaust processing apparatus as claimed in claim 2, wherein said adsorbing means comprises either a chemical adsorbing member for chemically adsorbing at least the source gases or a physical adsorbing member for physically adsorbing at least the source gases.

13. The exhaust processing apparatus as claimed in claim 1, wherein said cracking furnace comprises a heating portion provided with a heating means for heating the exhaust, and an enlarged portion disposed downstream said heating portion and having a passage whose cross-sectional area is larger than that of said heating portion.

14. The exhaust processing apparatus as claimed in claim 13, wherein said enlarged portion is provided with a cooling means for forcibly cooling the exhaust heated in the heating portion.

15. The exhaust processing apparatus as claimed in claim 14, wherein said cooling means is disposed along the periphery of the enlarged portion.

16. The exhaust processing apparatus as claimed in claim 15, wherein the enlarged portion is provided with a baffle plate for guiding the exhaust along an inner wall of the enlarged portion and for changing a flowing direction of the exhaust.

17. The exhaust processing apparatus as claimed in claim 14, wherein said cooling means is disposed inside the enlarged portion.

18. The exhaust processing apparatus as claimed in claim 17, wherein the cooling means comprises a pipe disposed just under the heating portion to flow coolant through the pipe.

19. The exhaust processing apparatus as claimed in claim 17, wherein the cooling means comprises a pipe disposed just under the heating portion to flow coolant through the pipe, and fins connected to the surface of the pipe.

20. The exhaust processing apparatus as claimed in claim 17, wherein said cooling means comprises a plurality of plate members disposed inside the enlarged portion to extend a passage formed inside the enlarged portion, and a cooling pipe for cooling the plate members.

21. The exhaust processing apparatus as claimed in claim 17, wherein the cooling means comprises a pipe for flowing coolant, the pipe being able to be vibrated in the enlarged portion.

22. An exhaust processing apparatus comprising:
a cracking furnace disposed on a discharging side of a reactor for cracking and solidifying part of unreacted source gases contained in exhaust emitted from the reactor which supplies source gases to a semiconductor substrate supported inside the reactor to grow crystals on the substrate and discharges the exhaust containing reacted source gases and the unreacted source gases;
collecting means for collecting components solidified in said cracking furnace;
adsorbing means for chemically and/or physically adsorbing an exhaust passes through said collecting means;
a piping for connecting the reactor, said cracking furnace, said collecting means, and said absorbing means; and
a bypass piping for directly connecting the reactor to said adsorbing means.

23. The exhaust processing apparatus as claimed in claim 22, further comprising:
shutoff means for opening and closing said bypass piping; and
control means for controlling said shutoff means such that said shutoff means is opened when the pressure of the exhaust passing through said cracking furnace and collecting means exceeds a predetermined value.

24. An exhaust processing apparatus comprising:
a cracking furnace disposed on a discharging side of a reactor for cracking and solidifying part of unreacted source gases contained in exhaust emitted from the reactor which supplies source gases to a semiconductor substrate supported inside the reactor to grow crystals on the substrate and discharges the exhaust containing reacted source gases and the unreacted source gases;
first collecting means for collecting components solidified in said cracking furnace;
adsorbing means for chemically and/or physically adsorbing an exhaust passed through said first collecting means;
a piping for connecting the reactor, said cracking furnace, said first collecting means, and said adsorbing means; and
bypass piping for directly connecting the cracking furnace to said adsorbing means.

25. The exhaust processing apparatus as claimed in claim 24, wherein said bypass piping includes second collecting means for collecting components solidified in said cracking furnace.

26. The exhaust processing apparatus as claimed in claim 25, further comprising:
shutoff means for opening and closing said bypass piping; and
control means for controlling said shutoff means such that said shutoff means is opened when the pressure of the exhaust passing through said first collecting means exceeds a predetermined value.

27. In an exhaust processing apparatus for cracking, solidifying and collecting part of unreacted source gases contained in exhaust discharged from a reactor in which source gases are supplied to a semiconductor substrate supported inside the reactor to grow crystals on the substrate and discharged as the exhaust containing reacted and unreacted source gases, a cracking furnace for cracking and solidifying part of the unreacted source gases, comprising:
a heating portion provided with heating means for heating the exhaust discharged from the reactor; and
an enlarged portion disposed downstream said heating portion and having a passage whose cross-sectional area is larger than that of said heating portion.

28. The cracking furnace as claimed in claim 27, wherein said enlarged portion is provided with a cooling means for forcibly cooling the exhaust heated in said heating portion.

29. The cracking furnace as claimed in claim 28, wherein the cooling means is disposed along the periphery of said enlarged portion.

30. The cracking furnace as claimed in claim 29, wherein said enlarged portion is provided with a baffle plate for guiding the exhaust along an inner wall of said enlarged portion and for changing the flowing direction of the exhaust.

31. The cracking furnace as claimed in claim 28, wherein the cooling means is disposed inside said enlarged portion.

32. The cracking furnace as claimed in claim 31, wherein the cooling means comprises a pipe disposed just under said heating portion to flow coolant through said pipe.

33. The cracking furnace as claimed in claim 31, wherein the cooling means comprises a pipe disposed just under said heating portion to flow coolant through said pipe, and fins connected to the surface of said pipe.

34. The cracking furnace as claimed in claim 31, wherein the cooling means comprises a plurality of plate members disposed inside said enlarged portion to extend a passage within said enlarged portion, and a cooling pipe for cooling said plate members.

35. The cracking furnace as claimed in claim 31, wherein the cooling means comprises a pipe for flowing coolant, said pipe being able to be vibrated in said enlarged portion.

36. An exhaust processing apparatus comprising:
 a cracking furnace disposed on a discharging side of a reactor for cracking and solidifying part of unreacted source gases contained in exhaust emitted from the reactor which supplies source gases to a semiconductor substrate supported inside the reactor to grow crystals on the substrate and discharges the exhaust containing reacted source gases and the unreacted source gases;
 a cake-filtration medium for collecting relatively large components solidified in said cracking furnace; and
 a depth filtration medium disposed downstream the cake-filtration medium to collect relatively small solidified components passed through the cake-filtration medium.

* * * * *